US010634784B2

(12) United States Patent
Yang et al.

(10) Patent No.: US 10,634,784 B2
(45) Date of Patent: Apr. 28, 2020

(54) DEVICE AND METHOD FOR DETECTING MAIN ACOUSTIC INDEXES OF MULTI-BEAM SONAR

(71) Applicant: SHANDONG UNIVERSITY OF SCIENCE AND TECHNOLOGY, Qingdao (CN)

(72) Inventors: Fanlin Yang, Qingdao (CN); Xiankun Wang, Qingdao (CN); Donghui Li, Qingdao (CN); Qianqian Li, Qingdao (CN); Bo Shi, Qingdao (CN); Dong Jing, Qingdao (CN); Xiushan Lu, Qingdao (CN); Xiaodong Cui, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 41 days.

(21) Appl. No.: 16/086,425

(22) PCT Filed: Jan. 16, 2018

(86) PCT No.: PCT/CN2018/072906
§ 371 (c)(1),
(2) Date: Sep. 19, 2018

(87) PCT Pub. No.: WO2018/153182
PCT Pub. Date: Aug. 30, 2018

(65) Prior Publication Data
US 2019/0101643 A1 Apr. 4, 2019

(30) Foreign Application Priority Data

Feb. 23, 2017 (CN) .......................... 2017 1 0098738

(51) Int. Cl.
G10K 11/00 (2006.01)
G01S 15/89 (2006.01)
(Continued)

(52) U.S. Cl.
CPC ...... *G01S 15/8945* (2013.01); *G01S 7/52004* (2013.01); *G01S 15/42* (2013.01); *G01S 15/8918* (2013.01); *G01S 15/8931* (2013.01)

(58) Field of Classification Search
None
See application file for complete search history.

(56) References Cited

U.S. PATENT DOCUMENTS 4,949,318 A * 8/1990 Patrick .................... G01S 7/526
367/135
9,470,779 B2 * 10/2016 Stokes .................... G01S 7/527

FOREIGN PATENT DOCUMENTS

CN 102901472 A 1/2013
CN 102927974 A 2/2013
(Continued)

OTHER PUBLICATIONS

International Search Report (PCT/ISA/210) dated on Apr. 17, 2018, by the State Intellectual Property Office of the P.R. China as the International Searching Authority for International Application No. PCT/CN2018/072906.
(Continued)

Primary Examiner — Aditya S Bhat
(74) Attorney, Agent, or Firm — Buchanan Ingersoll & Rooney PC

(57) ABSTRACT

A device and a method for detecting main acoustic indexes of multi-beam sonar pertaining to the field of hydrographic surveying and charting technology. The device includes a rotating device and a lifting gear installed in an anechoic tank. The bottom of the rotating device is equipped with a
(Continued)

multi-beam sonar that has its rotating plane perpendicular to the direction of track line and transmits signals along the horizontal direction. A standard hydrophone is equipped at the bottom of the lifting gear, and is connected with a signal collector. The device utilizes the standard hydrophone to receive the pulse signals transmitted by the multi-beam sonar and employs the multi-beam sonar to receive the standard sound source signals, designs the detection process for data collection for analysis and research, thereby achieving the detection of the frequency, source level and beam angle of multi-beam sonar.

2 Claims, 1 Drawing Sheet

(51) Int. Cl.
    *G01S 15/42*     (2006.01)
    *G01S 7/52*     (2006.01)

(56) References Cited

FOREIGN PATENT DOCUMENTS

| | | |
|---|---|---|
| CN | 202886601 U | 4/2013 |
| CN | 104122543 A | 10/2014 |
| CN | 106382982 A | 2/2017 |
| CN | 106886015 A | 6/2017 |

OTHER PUBLICATIONS

Written Opinion (PCT/ISA/237) dated on Apr. 17, 2018, by the State Intellectual Property Office of the P.R. China as the International Seraching Authority for International Application No. PCT/CN2018/072906.

Liu, Yicheng et al. "Detection Method for Detecting Acoustical Index of Single Beam Sounder", Hydrographic Surveying and Charting, vol. 35, No. 6, pp. 69-72, Nov. 2015 (with English abstract).

Foote, Kenneth G., "Protocols For Calibrating Multibeam Sonar", Journal of the Acousitcal Society of America, vol. 117, No. 4, Pt. 1, pp. 2013-2027, Apr. 30, 2005.

Chen, Yunyue, "Method for establishing standardized detection system for ocean sounding sonar", Journal of Waterway and Harbor, vol. 35, No. 6, pp. 642-646, Dec. 2014. (with English abstract).

Notice of the Opinion on the First Examination dated on Oct. 16, 2017, by the State Intellectual Property Office of the People's Republic of China in corresponding Chinese Patent Application No. 201710098738.X and an English translation of the Notice. (11 pages).

Notification to Grant Patent Right for Invention dated on Jan. 10, 2018, by the State Intellectual Property Office of the People's Republic of China in corresponding Chinese Patent Application No. 201710098738.X. (1 page).

* cited by examiner

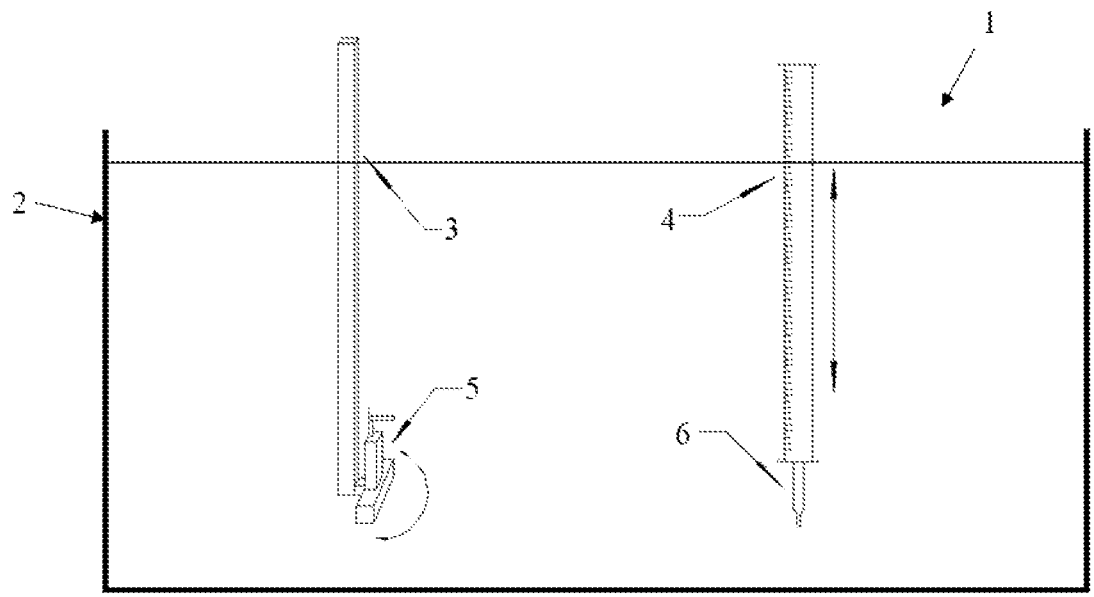

DEVICE AND METHOD FOR DETECTING MAIN ACOUSTIC INDEXES OF MULTI-BEAM SONAR

FIELD OF THE INVENTION

The present invention pertains to the field of hydrographic surveying and charting technology, and more particularly relates to a device and a method for detecting main acoustic indexes of a multi-beam sonar apparatus.

BACKGROUND OF THE INVENTION

The multi-beam sonar apparatus (i.e., a multi-beam sonar emitter also configured to receive/detect sound signals) is a sounding apparatus characterized by high precision, high efficiency and full coverage etc. In recent years, the multi-beam sonar apparatus has played a huge role in the underwater topographic survey, oceanographic survey, defense application and research etc. However, there is a lack of laboratory measurement and testing means to carry out standardized and effective detection of the multi-beam sonar apparatus itself, resulting in the serious impacts on the accuracy and credibility of observed data so that the data have great potential quality hazards.

SUMMARY OF THE INVENTION

Focusing on the above technical problems, this disclosure relates to a device and a method for detecting main acoustic indexes of a multi-beam sonar apparatus, which is characterized by reasonable design, overcomes the deficiencies of the prior art, and has beneficial effects.

To achieve the above objectives, the disclosure involves the following technical solutions:

A device for detecting main acoustic indexes of a multi-beam sonar apparatus. The device includes an anechoic tank (i.e., a tank free from echo or configured to absorb/deaden sound to prevent echo), in which a rotating device and a lifting gear are installed; the multi-beam sonar apparatus (a multi-beam sonar emitter) is equipped at the bottom of the rotating device; the multi-beam transducer has its rotating plane perpendicular to the direction of track line and transmits signals (e.g., sound waves) along the horizontal direction; a standard hydrophone is equipped at the bottom of the lifting gear and is connected with a signal collector for recording real time open-circuit voltage values.

Preferably, the main acoustic indexes of the multi-beam sonar apparatus are detected in the anechoic tank, all the surfaces of which are fully paved with silencers following the requirements of the acoustic absorption coefficient and frequency band (i.e., material that absorbs/silences sound is fixed to the inner surfaces of the anechoic tank), to eliminate the reflection of sidewall, the bottom of the tank and water surface to the incident sound wave, thereby simulating an open water acoustic field without reflection of sound. The anechoic tank is required to satisfy the conditions of free field and far field for underwater acoustic measurement, and once the operating frequency of the instrument to be detected is determined, the tank is designed in such a manner that the acoustic radiation pulse and reflected pulse are neither overlapped nor interfered in the measurement of pulse method.

Preferably, both the lifting gear and rotating device have the precision and system stability satisfying the detection requirements, and can meet the load requirements. The rotating device can rotate freely around its axis in the horizontal plane (i.e., is configured to rotate the multi-beam sonar apparatus about the vertical axis of the rotating device), and the lifting gear can go up and down freely along the plumb line in the vertical plane. The horizontal distance between the lifting gear and rotating device is set to satisfy the far field requirement.

Preferably, the main acoustic indexes of multi-beam sonar are detected by combining the anechoic tank and pulse sound technique. The reason is because any anechoic material fails to achieve 100% soundproofing, and hence it is not scientific and reasonable enough to build a free field environment merely with the anechoic materials, inevitably suffering from the defect of incomplete noise elimination. Moreover, for the sonar having a larger frequency variation range and operating frequency beyond the sound absorption range of the anechoic materials, when detecting the acoustic parameters of low frequency band thereof, such anechoic materials cannot fit the bill. Yet, the pulse sound technique is a method where the transducer (emitter) and hydrophone are placed a certain distance from the reflector, giving rise to a sufficient time difference between the direct sound wave and reflected sound wave when in measurement, so as to separate the direct and reflected sound waves, simulate the free field and achieve the purpose of measurement.

In addition, a method is disclosed for detecting main acoustic indexes of multi-beam sonar, employing the device according to Claims and described above, comprising the following steps:

Step 1: detecting the transmitting directivity of multi-beam sonar, including the following specific steps:

Step 1.1: adjusting the parameters (including frequency, power, pulse width, gain and threshold) of multi-beam sonar equipment, so that pulse signals can be transmitted normally and stably, and adjusting the lifting device so that standard hydrophone and multi-beam transducer are roughly at the same level;

Step 1.2: using the rotating device to rotate the multi-beam transducer within the range of 360° in the horizontal plane with certain angle interval, recording the open-circuit voltage value of standard hydrophone collected at each angle, and the position (angle) with the maximum open-circuit voltage value being the vertical plane of acoustic axis;

Step 1.3: adjusting the multi-beam transducer to the position with the maximum open-circuit voltage value of the standard hydrophone as set forth in Step 1.2, fixedly securing the multi-beam transducer, adjusting the standard hydrophone below the horizontal plane (estimated) of multi-beam transducer's center, then elevating the standard hydrophone above the horizontal plane of multi-beam transducer's center at certain distance, and recording the open-circuit voltage value of standard hydrophone at each location, the position with the maximum open-circuit voltage being the horizontal plane of acoustic axis;

Step 2: detecting the receiving directivity of multi-beam sonar, including the following specific steps:

Step 2.1: replacing the standard hydrophone with a standard sound source, and adjusting the lifting gear until the standard sound source arrives at the location of acoustic axis;

Step 2.2: using the rotating device to rotate the multi-beam transducer in the horizontal plane with certain angle interval;

Step 2.3: receiving the signals from the standard sound source at different angles by using the multi-beam collection software, and obtaining the backscatter intensity value at each angle by parsing the multi-beam raw data, thereby obtaining the receiving directivity and beam angle of the multi-beam sonar;

Step 3: pre-processing the data, including the following specific steps:

Step 3.1: setting the time domain of pulse width, and separating the direct signals, reflected signals and refracted signals;

Step 3.2: designing a band-pass filter for frequency domain filtering, and filtering the environmental noise or system noise in the harmonic and pulse width;

Step 4: calculating the frequency value with Formula (1.1);

$$f = \frac{N*v}{n} = \frac{N}{T};\qquad(1.1)$$

Where f denotes the frequency; N denotes the number of integer periods in time T; v denotes the sampling frequency; n denotes the number of sampling points within N period(s);

Step 5: calculating the source level of the multi-beam transducer with Formula (1.2);

$$SL=20 \lg e_s+20 \lg d-20 \lg M_s+120 \qquad(1.2);$$

Where SL denotes the source level, in dB; $e_s$ denotes the effective value of sound pressure, in V; d denotes the distance from the standard hydrophone to the multi-beam transducer, in m; $M_s$ denotes the receiving sensitivity of standard hydrophone, in V/Pa;

Step 6: calculating the beam angle.

Step 6.1: translating the pulse signal amplitude at each position into the sound level values;

Step 6.2: subtracting the maximum sound level values from the translated pulse signal amplitude in Step 6.1, arranging the obtained values in order to draw the directivity pattern; the maximum response sound level value on the main axis is 0 dB, and the two intersection points of directivity pattern and the sound level of −3 dB is the beam angle.

The disclosed device and method has the beneficial technical effects that include utilizing a standard hydrophone to detect the frequency, source level and beam width of the multi-beam sonar, helping to assure the reliability, accuracy and credibility of the data measured by the multi-beam sonar apparatus, filling in gaps of this field, and also providing a reference to the detection of other hydrographic instruments.

BRIEF DESCRIPTION OF THE DRAWINGS

FIG. 1 shows a schematic diagram of an embodiment of the device.

DESCRIPTION OF THE PREFERRED EMBODIMENTS

The following is the further detailed description in combination with the drawings and specific experiment.

FIG. 1 illustrates an embodiment of a device 1. The device 1 may include an anechoic tank 2. The device 1 may include a rotating device 3 and a lifting gear 4 positioned in the interior of the anechoic tank 2. A multi-beam sonar apparatus 5 (multi-beam sonar emitter) may be provided at the bottom end of the rotating device 3, such that the rotating device 3 is capable of rotating the multi-beam sonar apparatus 5 on a horizontal plane (i.e., the rotation axis is the vertical axis of the rotating device 3). The lifting gear 4 may include a hydrophone 6 (a standard hydrophone) at the bottom end of the lifting gear 4 that the lifting gear 4 may raise and lower.

The device may employ (i.e., be used to detect the main acoustic indexes of) the multi-beam sonar of R2 Sonic2024 model, with steps as follows:

(1) The R2 Sonic2024 multi-beam transducer is installed at the bottom of rotating device, keeping transmitting signals along the horizontal direction and the rotating plane of multi-beam transducer is perpendicular to the direction of track lines. The operating parameters (frequency, power, pulse width, gain and threshold etc.) of sonar equipment are adjusted so that pulse signals can be transmitted normally and stably.

(2) The RESON TC4014-5 standard hydrophone is mounted on the lifting support, and connected with an Agilent signal collector. When pulse signals enter the hydrophone, the signal collector can record real time open-circuit voltage values.

(3) The hydrophone is adjusted to be roughly in the same level with the multi-beam transducer. The hydrophone is fixedly secured, the rotating device is used to rotate the multi-beam transducer in the horizontal plane with 0.05° angle interval, and meantime the open-circuit voltage value of the hydrophone is recorded at this position (angle). After rotating for 360°, an open-circuit voltage value of hydrophone can be collected at each angle, and the position of maximum open-circuit voltage is the vertical plane of acoustic axis. The multi-beam transducer is adjusted to the position of maximum open-circuit voltage, the multi-beam transducer is fixedly secured, then the standard hydrophone is adjusted 1.5 m below the coarse acoustic axial plane, and the lifting device elevates the hydrophone at certain distance; meantime, the open-circuit voltage value of standard hydrophone at each location is recorded, until the standard hydrophone is elevated 1.5 m above the acoustic axial plane; the position with the maximum open-circuit voltage is the horizontal plane of acoustic axis.

(4) The standard hydrophone is replaced with a standard sound source, and the lifting support is adjusted until the standard sound source arrives at the location of acoustic axis. By controlling the rotating device, the transducer can rotate in the horizontal direction of 0.05°, the multi-beam collection software receives signals from the standard sound source at different angles, and the backscatter intensity value at each angle can be obtained by parsing the multi-beam XTF data, thereby obtaining the receiving directivity and beam angle of the multi-beam sonar;

(5) Data pre-processing. After the data collection, data are required to be pre-processed. Allowing for the reflected sound wave, system noise and environmental noise etc. in the collected signals, such interference is to be filtered before the index calculation. The appropriate time domain of pulse width is set to separate the direct signals from reflected (refracted) signals; a band-pass filter is designed for frequency domain filtering, filtering the environmental noise or system noise in the harmonic and pulse width.

(6) Calculation of frequency. The frequency value is calculated with a formula.

(7) Calculation of source level. The source level of multi-beam transducer is calculated based on the maximum sound pressure amplitude of pulse signals.

(8) Calculation of beam angle. The maximum in all the sound level values is subtracted from the translated pulse signal amplitude (into the sound level value) at each position, the obtained values are arranged in order to draw the directivity pattern. At this moment, the maximum response sound level value on the main axis is 0 dB, and the corresponding open angle of sound level values on the two sides with respect to −3 dB is the beam angle.

The above are the detailed steps of the method for detecting main acoustic indexes of multi-beam sonar, and the calculation formula of the operating frequency in Step (6) is:

$$f = \frac{N * v}{n} = \frac{N}{T} \qquad (1.1)$$

Where f denotes the frequency; N denotes the number of integer periods in time T; v denotes the sampling frequency; n denotes the number of sampling points within N period(s).

The calculation formula of the source level in Step (7) is:

$$SL = 20 \lg e_s + 20 \lg d - 20 \lg M_s + 120 \qquad (1.2)$$

Where SL denotes the source level, in dB; $e_s$ denotes the effective value of sound pressure, in V; d denotes the distance from the standard hydrophone to the multi-beam transducer, in m; $M_s$ denotes the receiving sensitivity of standard hydrophone, in V/Pa.

The R2 Sonic2024 multi-beam sonar has the nominal source level of 210 dB, and the actual test value is 209.350 dB; the nominal frequency of 200 kHz, and the actual value is 200.003 kHz; the nominal beam width along the direction of track line of 1°, and the actual test value is 1.09°; the nominal beam width perpendicular to the direction of track line of 0.5°, and the actual test value is 0.57°.

The above description is certainly not a restriction to the claimed device and/or method, which are not limited to the aforementioned examples. Instead, any change, modification, addition or substitution made by an ordinarily skilled artisan in the substantive scope of the claimed device and/or method shall also pertain to the scope of protection of the invention.

What is claimed is:

1. A method for detecting main acoustic indexes of a multi-beam sonar, comprising the following steps:
   step (i): detecting a transmitting directivity of multi-beam sonar emitted by a device,
   the device comprising:
   (i-a) an anechoic tank possessing an interior;
   (i-b) a rotating device installed in the interior of the anechoic tank, the rotating device extending in a longitudinal direction between an upper end and a bottom end opposite the upper end in the longitudinal direction;
   the multi-beam sonar emitter provided at the bottom end of the rotating device, the multi-beam sonar emitter being configured to emit sonar signals in a horizontal direction perpendicular to the longitudinal direction, the multi-beam sonar emitter being further configured to detect sound;
   the rotating device being configured to rotate the multi-beam sonar emitter about the longitudinal axis of the rotating device;
   (i-c) a lifting gear installed in the interior of the anechoic tank, the lifting gear extending in a longitudinal direction between an upper end and a bottom end opposite the upper end in the longitudinal direction;
   the lifting gear comprising a hydrophone at the bottom end of the lifting gear, the hydrophone being configured to detect real-time open-circuit voltage values reflecting sound waves; and
   (i-d) a signal collector electrically connected to the hydrophone, the signal collector being configured to record the real time open-circuit voltage values,
   the detecting comprising:
   (i-a') adjusting parameters including frequency, power, pulse width, gain and threshold of the multi-beam sonar emitter so that pulse signals can be stably transmitted,
   adjusting the lifting device so that the standard hydrophone and the multi-beam transducer are roughly at a same level in the longitudinal direction,
   (i-b') using the rotating device to rotate the multi-beam transducer in predetermined angle intervals along a range of 360° in a horizontal plane while recording the real-time open-circuit voltage values at each of the predetermined angle intervals with the hydrophone, wherein a maximum open-circuit voltage value of the hydrophone is a vertical plane of acoustic axis,
   (i-c') using the rotating device to rotate the multi-beam sonar emitter when the maximum open-circuit voltage value of the hydrophone is detected and fixedly securing the multi-beam sonar emitter when the maximum open-circuit voltage value of the hydrophone is detected,
   adjusting a position of the hydrophone below a center of the multi-beam sonar emitter in the longitudinal direction, and
   gradually elevating the hydrophone above the center of multi-beam sonar emitter in the longitudinal direction by a plurality of predetermined distances and recording the open-circuit voltage value detected by the hydrophone at each of the predetermined distances to thereby detect the transmitting directivity of multi-beam sonar emitted by the device;
   step (ii): detecting a receiving directivity of the multi-beam sonar emitter, the detecting of the receiving directivity further comprising:
   replacing the hydrophone with a standard sound source configured to emit sound,
   adjusting the lifting gear until the standard sound source is positioned at the center of the multi-beam sonar emitter in the longitudinal direction,
   using the rotating device to rotate the multi-beam sonar emitter in the horizontal plane in predetermined angle intervals,
   receiving signals from the standard sound source at the predetermined angles using the multi-beam sonar emitter to collect multi-beam raw data,
   obtaining a backscatter intensity value at each of the predetermined angles by parsing the multi-beam raw data, thereby obtaining the receiving directivity and beam angle of the multi-beam sonar emitter,
   step (iii): pre-processing the data, including the following specific steps:
   setting a time domain of pulse width, and separating direct signals, reflected signals and refracted signals;
   designing a band-pass filter for frequency domain filtering and filtering the environmental noise or system noise in harmonic width and the pulse width;
   step (iv): calculating a frequency value based on:

$$f = \frac{N * v}{n} = \frac{N}{T}$$

wherein f denotes a frequency; N denotes a number of integer periods in time T; v denotes a sampling frequency; n denotes a number of sampling points within N period(s);

step (v): calculating a source level of the multi-beam sonar emitter based on:

$$SL = 20 \lg e_s + 20 \lg d - 20 \lg M_s + 120$$

wherein SL denotes the source level, in dB; $e_s$ denotes an effective value of sound pressure, in V; d denotes a distance from the hydrophone to the multi-beam sound emitter, in m; $M_s$ denotes a receiving sensitivity of the hydrophone, in V/Pa, step (vi): calculating the beam angle.

2. The method for detecting main acoustic indexes of multi-beam sonar according to claim 1, the step (vi) comprising:

translating the pulse signal amplitude at each position into sound level values;

subtracting maximum sound level values from the translated pulse signal amplitude to obtain obtained values; and arranging the obtained values in order to draw a directivity pattern wherein a maximum response sound level value on the main axis is 0 dB and two intersection points of the directivity pattern and a sound level of −3 dB is the beam angle.

* * * * *